G. C. KINCANNON.
TRANSMISSION MECHANISM.
APPLICATION FILED JUNE 29, 1915.
1,208,329.
Patented Dec. 12, 1916.
3 SHEETS—SHEET 2.
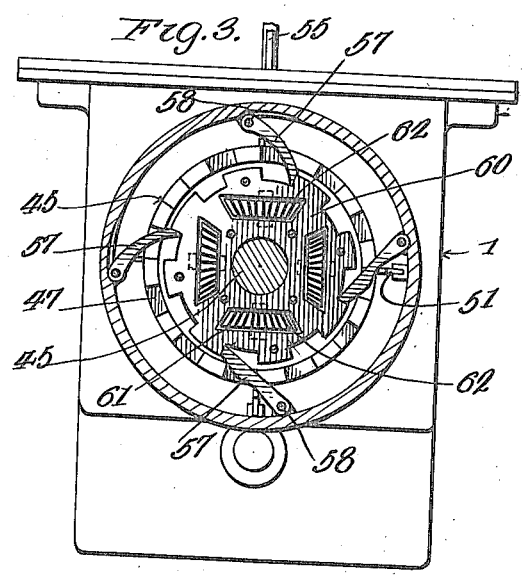
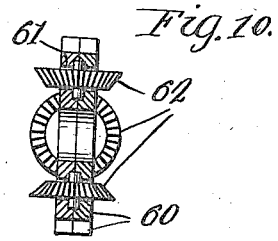
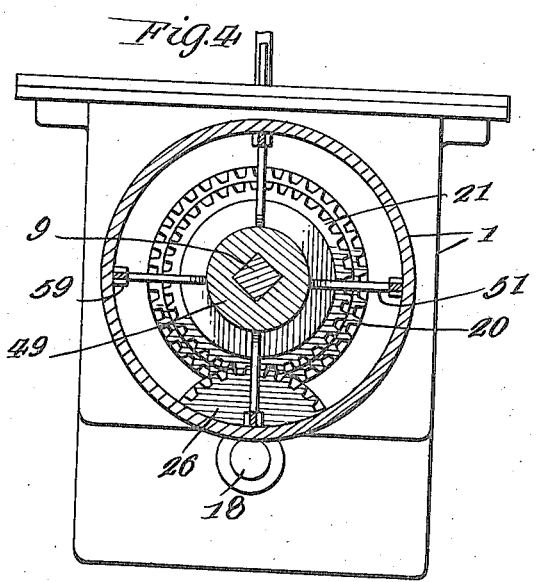
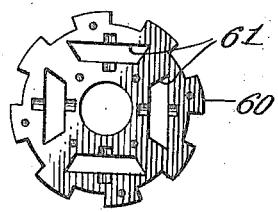
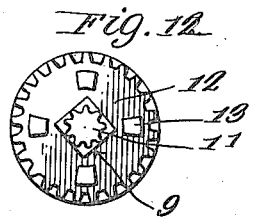

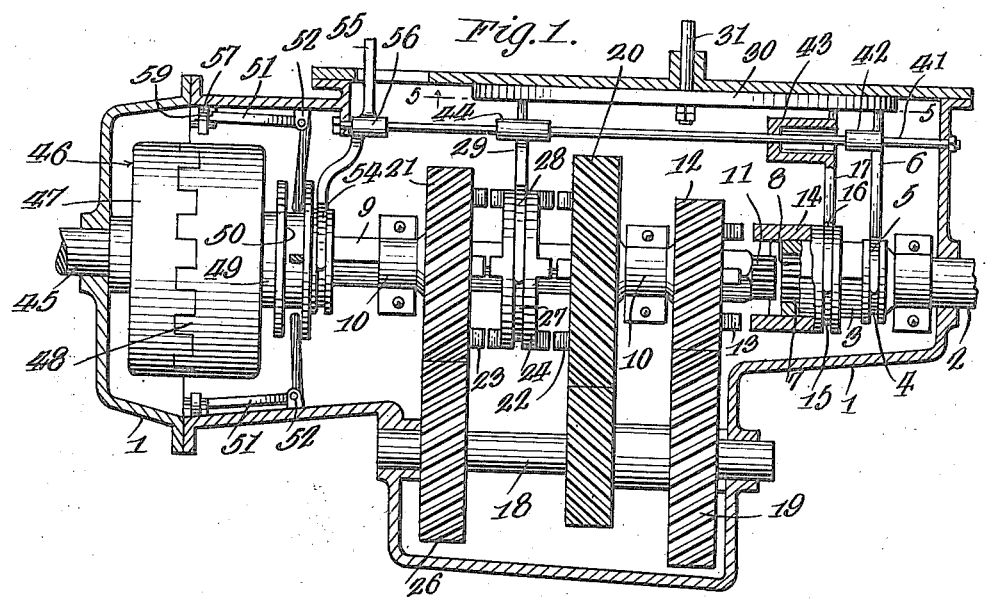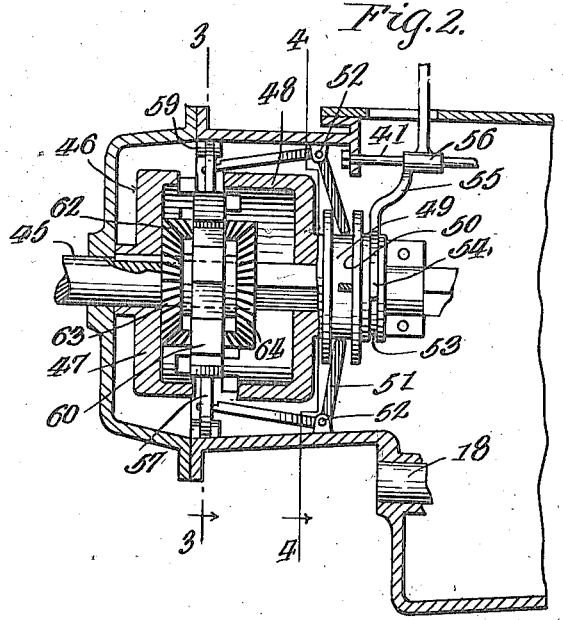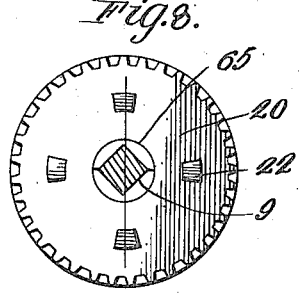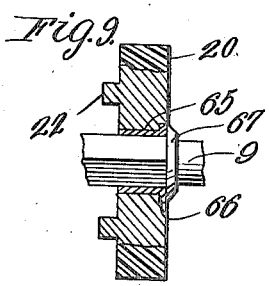

G. C. KINCANNON.
TRANSMISSION MECHANISM.
APPLICATION FILED JUNE 29, 1915.
1,208,329.
Patented Dec. 12, 1916.
3 SHEETS—SHEET 3.
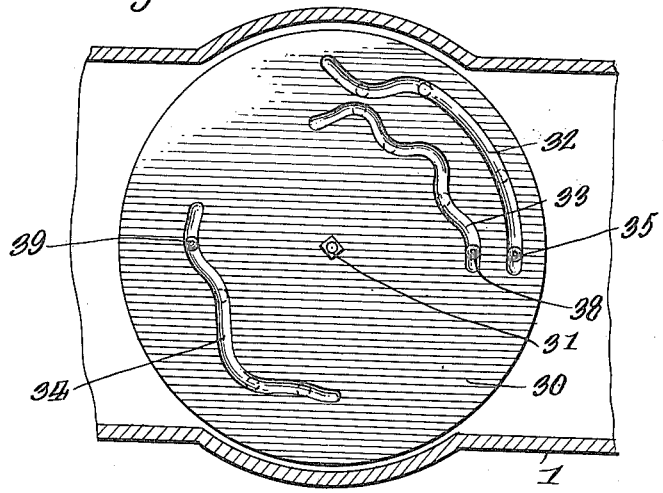
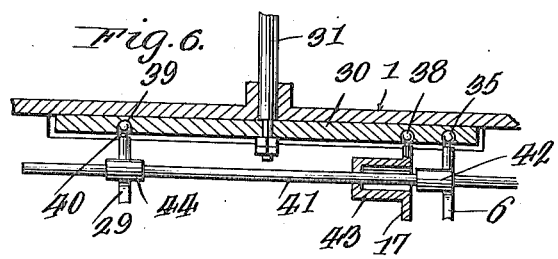
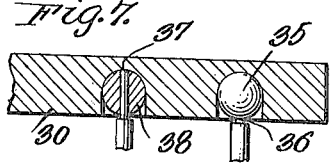
Inventor
George C. Kincannon
Witnesses
Guy M. Spring
W. E. Valk Jr.
By Richard B. Owen.
Attorney

UNITED STATES PATENT OFFICE.

GEORGE C. KINCANNON, OF EXCELSIOR, WISCONSIN.

TRANSMISSION MECHANISM.

1,208,329.

Specification of Letters Patent.  Patented Dec. 12, 1916.

Application filed June 29, 1915. Serial No. 37,070.

*To all whom it may concern:*

Be it known that I, GEORGE C. KINCANNON, a citizen of the United States, residing at Excelsior, in the county of Richland and State of Wisconsin, have invented certain new and useful Improvements in Transmission Mechanism, of which the following is a specification.

My invention relates to transmission and to the operating mechanism therefor.

An object of the invention is to provide a means for changing or shifting the speed gears of an automobile or other vehicle in such a manner that the operator, by the mere movement of a lever to a predetermined position (or by the manipulation of some equally simple device), may so adjust mechanism that upon operating the ordinary clutch shifting contrivance, the said mechanism will coöperate with associate mechanism to in this manner obtain a proper speed gear shift or a shift corresponding to that particular position assumed by said lever.

A further object of the invention is to provide a means for changing the speed of the vehicle at will and without subjecting the transmission mechanism or other parts of the vehicle to injury by concussion or jar incident to variations in speed from high to low or vice versa.

As a still further object of the invention I contemplate a transmission mechanism wherein provision is made for variations in speed when at "reverse."

I still further contemplate a purely mechanical, easily accessible and readily understandable transmission control, the operation of which is not only in a sense automatic, but positive, certain and unfailing.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a side elevation of my improved transmission mechanism, the gear casing being shown in section. Fig. 2 is a longitudinal sectional view of the reverse mechanism. Fig. 3 is a section on the line 3—3 of Fig. 2. Fig. 4 is a section on the line 4—4 of Fig. 2. Fig. 5 is a section on line 5—5 of Fig. 1. Fig. 6 is a cross section of the operating mechanism. Fig. 7 is a fragmentary sectional view illustrating the manner in which the speed gear shifters engage with the rotatable shifting plate. Fig. 8 is an elevation of one of the change speed gears. Fig. 9 is a cross section of the gear illustrated in Fig. 8. Fig. 10 is a fragmentary sectional view illustrating the gear arrangement constituting the reverse mechanism. Fig. 11 is an elevation of a combined gear support and ratchet. Fig. 12 is an elevation of a second change speed gear. Fig. 13 is an elevation of one of the sliding clutch devices.

Before proceeding with the description of the drawings, I desire to call particular attention to the fact that while I have evolved my invention with particular reference to its use as transmission control mechanism for automobiles, the same, if it is desired, may be used in a like capacity in connection with various other machines and parts thereof.

Referring now to the drawings by numerals, 1 designates as an entirety the gear casing within which the device of my invention is arranged. A drive shaft 2 is mounted to enter the casing 1 in the manner common to the art, the said shaft at its inclosed end being polygonal or square in cross section. Upon the squared portion, (not shown) of the said shaft 2 is mounted a sliding clutch member 3, said member, as shown to advantage in Fig. 1 being circumferentially grooved, as indicated at 4 to receive the forked or bifurcated terminal 5 of a speed gear shifter 6. The clutch member 3 is recessed as indicated at 7 and provided with internal teeth 8 that motion may be transmitted from the drive shaft 2 directly to what will hereinafter be termed the transmission shaft.

The transmission shaft, designated 9, is mounted in suitable bearings 10 therefor interiorly of the gear casing 1. The forward end of the said shaft 9 is somewhat reduced, the reduced portion forming a pinion 11 of suitable size whereby to meshingly engage with the teeth 8 of the clutch member 3. By such engagement, and as before suggested, motion is transmitted directly from the drive shaft 2 to the transmission shaft 9.

A first change speed gear 12 is mounted loose upon the shaft 9 in proximity to the pinioned end thereof, the teeth of the gear being cut at an angle to reduce friction and otherwise render power transmission more efficacious. The face of the gear 12 next adjacent the pinion 11 is equipped with clutch devices 13 that motion may be transmitted thereto from the drive shaft 2. A second sliding clutch member 14 is mounted on the inclosed end of the drive shaft 2 and to embrace and engage the clutch member 3, the mentioned clutches being of complemental formation in cross section. The clutch member 14, like the member 3, is circumferentially grooved as at 15 to receive the bifurcated or forked terminal 16 of a second speed gear shifter 17 mounted to extend in parallelism with the speed gear shifter 6 and in adjacent proximity thereto. Clutch member 14, through movement of speed gear shifter 17 is adapted to engage the clutch devices 13 upon the speed gear 10 that motion may be transmitted thereto.

An auxiliary or counter shaft 18 is mounted in the gear casing 1 in parallelism with the transmission shaft 9. A gear 19 is mounted on this last mentioned shaft to mesh with the gear 12 previously described. Said shaft 9 is further provided with a second speed gear 20 and a third speed gear 21, the latter being comparatively small. Both gears are equipped with clutch devices designated respectively 22 and 23, said devices being adapted for meshing engagement with one or the other face of a double sliding clutch member 24 mounted on the shaft 9 between said two gears. Both gears (20 and 21) are loose upon the shaft 9 and provided, like the gear 12, with angular teeth. The gear 20 is in mesh with the gear 25 on the shaft 18 and gear 21 with a gear 26 on the shaft 18, the latter gear being comparatively large. Clutch member 24 is circumferentially grooved as indicated at 27 to receive the bifurcated or forked end 28 of a third speed gear shifter 29.

Through the gears and other mechanism above described, low, intermediate and high speed may be obtained. For instance, when it is desired that the automobile or vehicle be propelled at low speed, motion is transmitted from the drive shaft 2 to the transmission shaft 9 as follows:—through sliding clutch member 14, gear 12, gear 19, shaft 18, gear 25, gear 20, and clutch member 24, the latter being in engagement with the clutch device 22 upon the said gear 20. To obtain an intermediate or second speed, motion is transmitted to the shaft 18 in the manner set forth and thence from the gear 26, gear 21 and clutch member 24 to the transmission shaft. When a second speed is to be obtained, the clutch device 24 should be in engagement with the teeth 23 formed on the gear 21. Gears 20 and 21 are both loose upon the shaft 9, while gears 25 and 26 are both keyed or otherwise secured to the shaft 18.

That the speed gear shifters 6, 17 and 29 may be moved in unison I provide what may be termed a rotatable speed gear shifter plate or disk 30. Said plate 30 is rotatable through manipulation of a supporting shaft 31 in turn adapted to be operated by any suitable means mounted in proximity to the steering wheel of the vehicle (not shown). Tortuous grooves 32, 33 and 34 are formed in the plate 30, each of the several grooves being of a special formation or design that the several shifts incident to a change in speed may be made without injury to the gears and in the manner desired. Groove 32 is adapted to receive a ball member 35 mounted on a spindle 36 at the outer end of the shifter 6 that the said shifter may be moved longitudinally of the gear case a sufficient distance to slide the clutch member 3, or more particularly the teeth forming a part thereof into or out of mesh with the pinion 11. Gear shifter 17 is likewise provided with a spindle 37 and ball member 38 and the latter fitting in the groove 33 that the clutch member 14 may be moved longitudinally of the drive shaft 2 and the clutch device forming a part thereof into and out of mesh with the teeth or devices 13 projecting laterally from the gear 12. Gear shifter 29, like the shifters previously described is also provided with a ball member 39 and spindle 40. In view of the fact that this last mentioned ball member is mounted to fit within the groove 34, the clutch member 24 may be shifted into meshing engagement with either the clutch device 23 or the clutch device 22 as occasion demands. When in mesh with the latter device, a low speed is obtained and when in mesh with the former device, a second or intermediate speed is obtained.

As a guide for the several shifting devices, I provide a rod 41 the terminals of which are secured or fixed to the gear casing 1. Gear shifter 6 is enlarged as at 42, gear shifter 17 as at 43 and gear shifter 29 as at 44 that the several shifting arms or devices may be directed or guided in a manner resulting in proper movement of the several clutch devices.

Coming now to a description of the mechanism utilized to obtain a reverse rotation of the driven shaft 45, 46 designates as an entirety a clutch casing one of the sections 47 of which is keyed or otherwise secured to the shaft 45 and the other of said sections 48 mounted for sliding movement upon the squared end of the transmission shaft 9. Section 48 is provided with a sleeve-like enlargement 49, circumferentially grooved as indicated at 50 to receive one end of a plurality of bell crank levers 51 pivoted as at 52 interiorly of the gear casing. Sleeve or enlargement 49 is provided with a second circumferential groove 53 within which groove the bifurcated or forked end 54 of a shifter arm 55 is mounted. Said arm 55 is enlarged at 56 to engage with the rod 41, the rod acting as the guide therefor.

Upon the opposite terminal of each bell crank 51 is mounted a pawl 57 pivoted as at 58 between lugs 59 integral with the gear casing. A combined gear support and ratchet wheel 60 (made up of duplicate connected sections) is mounted loose upon the inclosed end of the driven shaft 45. Openings 61 are formed on the ratchet 60 to receive bevel gears 62 journaled as shown in bearings therefor formed by said wheel. The bevel gears 62 at all times mesh with a bevel gear 63 mounted on the shaft 45 and secured to the clutch casing section 47 and with a bevel gear 64 mounted on the shaft 9, the several gears (62, 63 and 64) being inclosed by said clutch casing to be protected and incased. Each bell crank 51 is in engagement with one of the mentioned pawls 57 so that the latter, when the sections 47 and 48 are in engagement one with the other, may be swung into a position entirely without the casing 46.

When it is desired that the rotation of the gear 45 be reversed, it will be necessary that the arm 55 be manipulated to move enlargement 49 and the section 48 of which it is a part away from the section 47 that the teeth of the respective section may be disengaged. Such movement of section 48 will actuate the several bell crank levers 51, and by such actuation, cause the several pawls 57 to engage with the teeth of the ratchet 60. By such engagement, the ratchet is locked against rotation and motion transmitted to the gear 63 secured to the shaft 45 through the gears 62 and the gear 64, the latter, gear 46 being mounted on the transmission shaft 9.

That the several gears 12, 20 and 21 may be held against longitudinal displacement incident to the several speed gear shifts, attention is directed to the bushing 65 and the engagement flange 66 thereon, the said flange engaging an annular flange 67 integral with the transmission shaft.

From the foregoing taken in connection with the accompanying drawings it is apparent that different speeds may be obtained irrespective of the direction of rotation of the driven shaft 45; that the grooves 32, 33 and 34 and the rotatable plate 30 are of such a novel configuration or design as to automatically slide the various clutch devices into and out of engagement with the several associate gears according to the particular shift or change of speed; and that the driven shaft 45, by the clutching engagement of section 48 with the section 47 is rotated at a speed equal to the speed of rotation of transmission shaft 9 in that the former, shaft 45, is coupled thereto.

In reduction to practice, I have found that the form of my invention, illustrated in the drawings and referred to in the above description, as the preferred embodiment, is the most efficient and practical; yet realizing that the conditions concurrent with the adoption of my desire will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent is:

1. In transmission mechanism, a driven shaft, a clutch device mounted on said shaft having internal teeth, a transmission shaft axially alined with said driven shaft, teeth formed at one end of said transmission shaft, a gear loose upon said transmission shaft, a second clutch device mounted on said first mentioned clutch device, and a means to move the mentioned clutch devices, respectively, into engagement with the teeth upon said transmission shaft and into engagement with the said gear for the purpose specified.

2. In transmission mechanism, a driven shaft, a transmission shaft axially alined with said driven shaft, a first clutch device mounted on said driven shaft, a clutch member formed upon said transmission shaft, a second clutch device mounted upon said first mentioned clutch device, a clutch device loose upon said transmission shaft, a means to move said first clutch device into engagement with the clutch member upon said transmission shaft, and the second clutch device into engagement with the clutch member upon said transmission shaft, for the purpose set forth.

3. In transmission mechanism, a driven shaft, a transmission shaft, a counter-shaft, change speed gears mounted on said transmission shaft, like meshing gears mounted on said counter-shaft, clutch devices mounted on said transmission shaft and said driven shaft for movement into and out of engagement with certain of the change speed gears, a guide bar mounted to extend parallel with said transmission shaft, a rotatable tortuously grooved disk, a means to manually rotate said disk, and means on said guide rod engaging in said tortuous grooves and with the clutch devices.

4. In transmission mechanism, a driven shaft, a transmission shaft axially alined with said driven shaft, a counter-shaft, a fixed guide rod, change speed gears mounted upon said transmission shaft like meshing gears on said counter-shaft, a plurality of clutch devices mounted upon said transmission shaft and said driven shaft for movement into and out of engagement with certain change speed gears, a rotatable disk provided with a plurality of tortuous grooves, a means to manually rotate said disk on a vertical axis, and shifters mounted on said guide rod and engaging with the respective tortuous grooves and with the respective clutch devices to shift the latter upon the driven shaft and the transmission shaft respectively to accordingly control transmission.

5. In transmission mechanism, a driven shaft, a transmission shaft axially alined with said driven shaft, an auxiliary shaft mounted in parallelism with said transmission shaft, change speed gears mounted loosely upon said transmission shaft, meshing change speed gears mounted on said auxiliary shaft, clutch devices mounted for sliding movement upon said transmission shaft, clutch devices mounted for sliding movement upon said driven shaft, and a common means to move the several clutch devices.

6. In transmission mechanism, a driven shaft, a transmission shaft, a supplemental shaft mounted in parallelism with said transmission shaft, change speed gears of various sizes mounted on said auxiliary shaft, like meshing gears mounted on said transmission shaft, a clutch device mounted on said transmission shaft for movement into and out of clutch engagement with certain of the change speed gears thereon, a clutch member mounted on said driven shaft for movement into and out of clutch engagement with a gear upon said transmission shaft, a clutch device on said driven shaft for movement into and out of clutch engagement with the said transmission shaft, and a single rotary element operable to shift the mentioned clutch devices.

In testimony whereof I affix my signature in presence of two witnesses.

GEORGE C. KINCANNON.

Witnesses:
A. T. KINCANNON,
O. B. PETERS.